(12) United States Patent
Älveby

(10) Patent No.: US 7,861,669 B2
(45) Date of Patent: Jan. 4, 2011

(54) CONTROLLED COLLAR VACUUM

(75) Inventor: Nils Älveby, Stockholm (SE)

(73) Assignee: Delaval Holding AB, Tumba (SE)

( * ) Notice: Subject to any disclaimer, the term of this patent is extended or adjusted under 35 U.S.C. 154(b) by 197 days.

(21) Appl. No.: 10/594,882

(22) PCT Filed: Apr. 15, 2005

(86) PCT No.: PCT/SE2005/000546

§ 371 (c)(1),
(2), (4) Date: Sep. 29, 2006

(87) PCT Pub. No.: WO2005/104824

PCT Pub. Date: Nov. 10, 2005

(65) Prior Publication Data

US 2007/0193521 A1    Aug. 23, 2007

(30) Foreign Application Priority Data

May 3, 2004    (SE) .................. 0401142

(51) Int. Cl.
*A01J 5/04* (2006.01)
(52) U.S. Cl. .................. 119/14.08; 119/14.47
(58) Field of Classification Search .............. 119/14.08, 119/14.47
See application file for complete search history.

(56) References Cited

U.S. PATENT DOCUMENTS

| | | | | |
|---|---|---|---|---|
| 3,255,732 A | * | 6/1966 | Raht | 119/14.52 |
| 4,173,946 A | * | 11/1979 | Maier et al. | 119/14.36 |
| 4,200,058 A | * | 4/1980 | Happel | 119/14.01 |
| 5,134,967 A | * | 8/1992 | Marshall | 119/14.47 |
| 6,257,169 B1 | | 7/2001 | Oosterling | |

(Continued)

FOREIGN PATENT DOCUMENTS

EP    0277396 A1    12/1987

(Continued)

OTHER PUBLICATIONS

WO 0045630 translation, retrieved from EPO website Jan. 4, 2010.*

(Continued)

*Primary Examiner*—Rob Swiatek
*Assistant Examiner*—Kristen C Hayes
(74) *Attorney, Agent, or Firm*—Harness, Dickey & Pierce, P.L.C.

(57) ABSTRACT

The present invention relates to a milking machine and a method for milking animal using a milking machine, wherein the milking machine comprises at least a first teat cup, the first teat cup is provided with a teat cup liner to be positioned around a teat of the milking animal, the teat cup liner comprises a lower end connected to a milking vacuum source for drawing milk from the milking animal, and a top end having a space and an orifice in which the teat is to be introduced, the teat cup liner further comprises an inlet to the space connected to a space vacuum source. The method is comprises the step of setting the vacuum level in the space so that the vacuum difference between the vacuum level in the lower end and the vacuum level in the space is related to a milking criteria for the particular udder quarter being milked.

14 Claims, 3 Drawing Sheets

U.S. PATENT DOCUMENTS

| | | | |
|---|---|---|---|
| 6,308,655 B1 * | 10/2001 | Oosterling | 119/14.08 |
| 6,546,893 B1 * | 4/2003 | Happel et al. | 119/14.47 |
| 2004/0035367 A1 * | 2/2004 | Maier et al. | 119/14.07 |
| 2005/0072362 A1 | 4/2005 | Innings | |
| 2007/0157887 A1 * | 7/2007 | Fernandez | 119/14.49 |
| 2007/0215053 A1 * | 9/2007 | Duke | 119/14.47 |

FOREIGN PATENT DOCUMENTS

| | | |
|---|---|---|
| SE | 521080 C2 | 9/2003 |
| WO | WO 98/28969 | 7/1998 |
| WO | WO 0045630 A1 | 8/2000 |
| WO | WO 0119169 A1 | 3/2001 |
| WO | WO 02054857 A1 | 7/2002 |

OTHER PUBLICATIONS

Written Opinion dated for PCT/SE2005/000546 Nov. 16, 2006.

* cited by examiner

CONTROLLED COLLAR VACUUM

TECHNICAL FIELD

The present invention relates to a milking machine for controlling the vacuum levels in a space of a teat cup liner and a method therefore.

BACKGROUND OF THE INVENTION

In machine milking systems it is important to milk the animal in an efficient manner, i.e. a fast and complete milking. That means that the milking of the animal should not take unnecessary long time and that all milk contained in the udder should be withdrawn and collected. This should also be performed while treating the animal and its teats gently so as not to inflict any pain or injuries.

In this respect the design of teat cups, comprising teat cup shells and teat cup liners, as well as for instance applied vacuum levels, are important factors for achieving the above mentioned goals.

Considerable efforts have been put in design of teat cups, especially teat cup liners of the teat cup to find solutions which treat the teats gently, and a number of different designs have been presented. However, it is also very important to achieve a fast milking for economic purposes and the strive for faster milking equipment, including teat cups and teat cup liners, is always present.

Most teat cups and teat cup liners are designed in a similar way. A teat cup liner comprises an orifice at the top end where a teat maybe introduced, and a vacuum is applied to the lower end of the teat cup liner for drawing milk from the teat and transporting the milk to a container. An alternating vacuum is supplied to the space between the teat cup and the teat cup liner to achieve a pulsating movement of the teat cup liner to thereby massage the teat.

The teat cup liner is often supplied with a space, or a collar, at the top end. That is, the teat cup liner has, at the top end, a part which has a greater inner diameter than the rest of the teat cup liner.

EP 277 396 disclose a method for cleaning a teat of a female animal and a teat cup for use with the above method. The teat cup comprises a conduit line connected to the space of a teat cup for supplying a washing agent.

WO98/28969 discloses a device and a method for milking animals. The disclosure is primarily concerned with that the teat cup may creep upwards during milking and suggests that this can be prevented by supply leakage air to the teat cup liner space in a controlled way to prevent the vacuum level therein to rise.

During milking in automated milking machines one common problem is that not all udder quarters finish milking simultaneously. This means that to draw all milk from the udder quarter finishing last, some udder quarters will be over-milked, resulting in bad treatment of these teats. None of the above mentioned disclosures mentions or provides any solution to this problem. The term udder quarter is not intended to be limited to animals having four teats in the present specification. For animals having less than four teats the term udder quarter means one of the teats.

Better utilization of milking equipment and designs improving utilization is always desirable.

SUMMARY OF THE INVENTION

During milking with a teat cup liner three different vacuum levels arises. Firstly, the vacuum level $P_1$ outside the teat cup, that is the atmospheric vacuum level. Secondly, the vacuum level in the space, $P_2$ and thirdly, the vacuum level below the teat tip $P_3$. Exemplary levels are for instance $P_3$=38 kPa and $P_2$=12 kPa. $P_2$ and $P_3$ are related to $P_1$. That is, in the example above the pressure difference between $P_1$ and $P_3$ is 38 kPa.

The difference between $P_2$ and $P_3$ depends, among other things, on that the teat, when in the teat cup liner will increase in size and constitute a seal against the inner wall of the teat cup liner, but also to a great extend on the design of the teat cup liner. At the top part of the teat cup liner there will also be a seal but some leakage of air will result in a lower vacuum level $P_2$ in the space compared to the vacuum level $P_3$ at the teat tip.

The present inventor has discovered that the difference between the two vacuum levels $P_2$ and $P_3$ to a very large extent determines how fast the milking will be performed. Thus, by varying the vacuum level $P_2$ in the space, the milking time for an individual teat can be controlled. This can in turn be used in a number of different ways to achieve an optimal milking procedure, as will be described below.

It is a main object of the present invention to provide such apparatus and method that at least alleviate the above problems.

It is in this respect a particular object of the invention to provide such an apparatus and a method that provides the possibility to adjust the milking times for individual udder quarters.

It is still a further object of the invention to provide such an apparatus and a method that provides the possibility to reduce over-milking.

It is still a further object of the invention to provide an apparatus and a method that improves the utilization of the milking equipment. This is specifically prominent using quarter milking, that is when the milk flow is controlled for each udder quarter individually.

It is still a further object of the invention to provide such an apparatus and a method that provides the possibility to reduce milking times.

These objects among others are, according to a first aspect of the present invention, attained by a method for milking animal using a milking machine, wherein the milking machine comprises at least a first teat cup comprising a teat cup shell and a teat cup liner, the teat cup liner comprises a lower end connected to a milking vacuum source for drawing milk from the milking animal, and a top end having a space and a teat entrance in which a teat is to be introduced, the teat cup liner further comprises an inlet to the space connected to a source. The method comprises the step of setting the vacuum level in the space so that the vacuum difference between the vacuum level in the lower end and the vacuum level in the space is related to milking criteria for the animal being milked.

These objects among others are, according to a second aspect of the present invention, attained by a milking machine having at least a first teat cup comprising a teat cup shell and a teat cup liner, the teat cup liner comprises a lower end connected to a milking vacuum source for drawing milk from said milking animal, and a top end having a space and a teat entrance in which a teat is to be introduced, said teat cup liner further comprises an inlet to said space connected to a source. The milking machine further comprises control means controlling the vacuum in the space in relation to milking criteria for said animal.

Milking criteria for an animal can be any parameter relating to the milking process of drawing milk from the milking animal.

By setting the vacuum level in the space to thereby control the vacuum difference between the vacuum level below the teat tip and the vacuum level in the space, the milking characteristics, such as the milking speed, for that particular udder quarter can be controlled. Thus, a better and more controlled milking environment is achieved. The space below the teat tip in the teat cup liner is also denoted teat cup liner lower end in the present text. Setting the vacuum level in the space would imply to introduce a gas, such as air, when the vacuum level should be reduced, or removing gas from the space when the vacuum level should be increased.

According to one variant of the invention the milking criteria is the average or expected time to finish the milking for the particular udder quarter being milked, the average or expected milk yield, the average or expected milk flow, the presence or absence of mastitis, time since last milking, amount of food eaten since last milking, number of completed meals since last milking.

Different milking criteria may be used depending on the specific goals for the particular process. For instance, the expected time to finish milking could be one criterion suitable to use if the goal for the milking process is to finish the milking of all udder quarters simultaneously.

According to one variant of the invention the milking machine comprises one teat cup for each udder quarter to be milked, and comprises the step of:—setting the vacuum level in the space in each teat cup so that all udder quarters finish milking simultaneously.

By controlling the vacuum difference so that each udder quarter finish milking substantially at the same time, overmilking can be eliminated or at least reduced.

According to one variant of the invention the vacuum level in the space is set to a defined value at start of milking. According to another variant the vacuum level in the space is set dynamically during milking.

By only using a defined value at start of milking a very simple and efficient solution can be used. It has been discovered that the vacuum difference often varies between the front teat and back teat when milking using a milking claw. This can for instance depend upon that the milking claw is not hanging absolutely straight from the udder. This has the effect that the vacuum difference is different between the front teats and back teats, resulting in different milking times for the back teats and front teats.

According to one variant of the invention the milking machine comprises an animal identification system and a computer storing individual animal related milking criteria, and comprises the step of:—setting the vacuum level in the space individually for each animal being milked in the milking machine, or individually for each udder quarter for each animal being milked by the milking machine.

If the milking machine comprises an animal identification system the vacuum levels in the spaces may be set individually based on historic data at the start of the milking process.

According to one variant of the invention the milking machine comprises vacuum difference measuring means, provided to measure the vacuum difference between the lower end of the teat cup liner and the space, and comprising the step of:—adjusting the vacuum level in the space during milking in dependence of at least the measured vacuum difference.

By providing vacuum difference measurement means, the vacuum level in the space may be adjusted depending on the measured vacuum difference.

According to one variant of the invention the vacuum level in the space is set to a first value during a first part of the milking and to a second value during a second part of the milking.

By changing the vacuum difference during the milking process a higher milking speed can be achieved during high milk flows and a more gentle treatment during less high milk flows.

According to one variant of the invention the vacuum level in the space is set so that an increased vacuum difference is achieved between the space and the teat cup liner lower end for animals having a high milk flow. This can be achieved by defining a milk flow threshold and for animals having a higher milk flow than this threshold, a higher vacuum difference will be set.

By increasing the vacuum difference for animals with high milk flow a more rapid milking can be achieved.

According to one variant of the invention the teat cup or teat cup liner comprises a sensor for sensing vacuum levels in the space. According to yet an alternative a sensor is arranged in the teat cup liner below the teat tip to sense the vacuum level in the teat cup liner below the teat tip.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 8, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
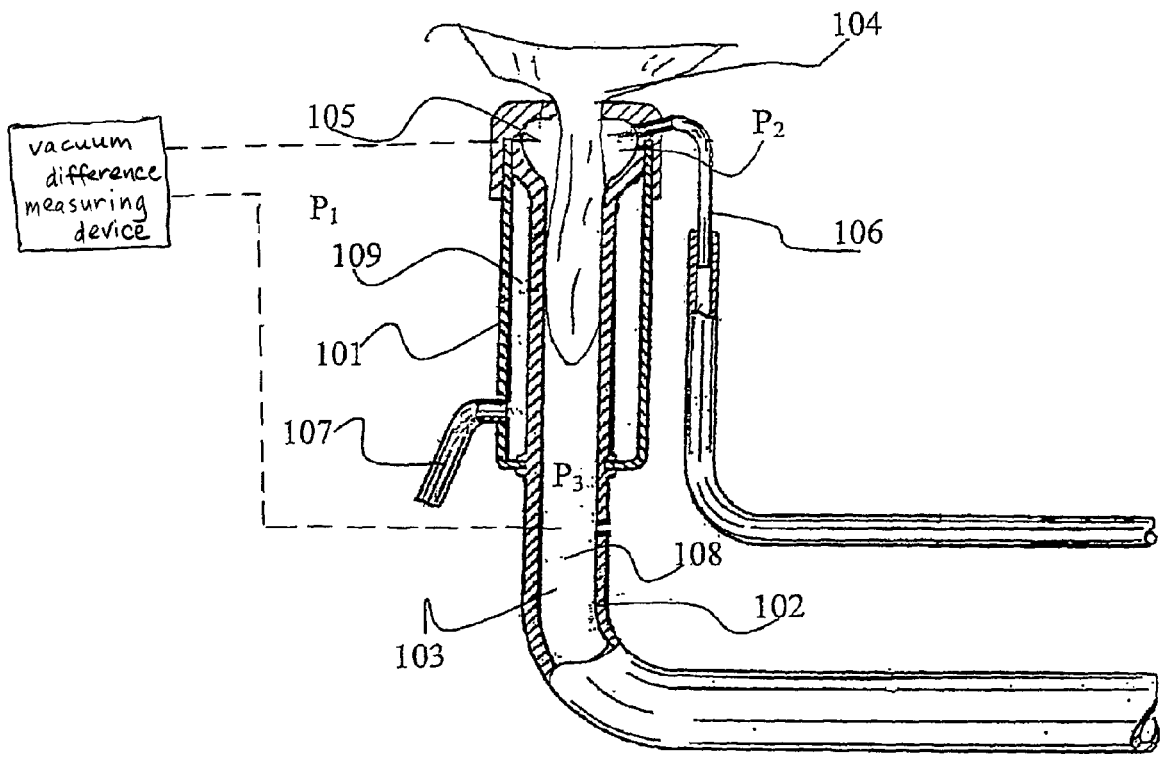
FIG. 1 is a schematic cross-sectional view of a known teat cup with a connection to the space of said teat cup liner.

FIG. 1 is a schematic cross-sectional view of a per se known teat cup comprising a teat cup shell 101 and teat cup liner 102. The teat cup liner 102 comprises a lower end 103, a top end 104 and a space 105. A teat will be introduced into the teat cup liner 102 through the top end 104 and extend towards the lower end 103. A vacuum connection line 106 is connected to the space 105 and arranged to supply a vacuum level to said space. The lower end 103 of the teat cup liner 102 is further connected to a vacuum source (not shown) which is provide to supply vacuum to the milking line 108 of the teat cup liner 102. Finally, a pulsating vacuum source is connected through connection 107 to the pulsating chamber 109 of the teat cup liner 102 for providing a pulsating movement of the teat cup liner 102 according to common praxis. The lower end 103 of the teat cup liner 102 is also denoted teat tip end or teat tip space and is the space in the teat cup liner below the teat tip.

Figure 2:
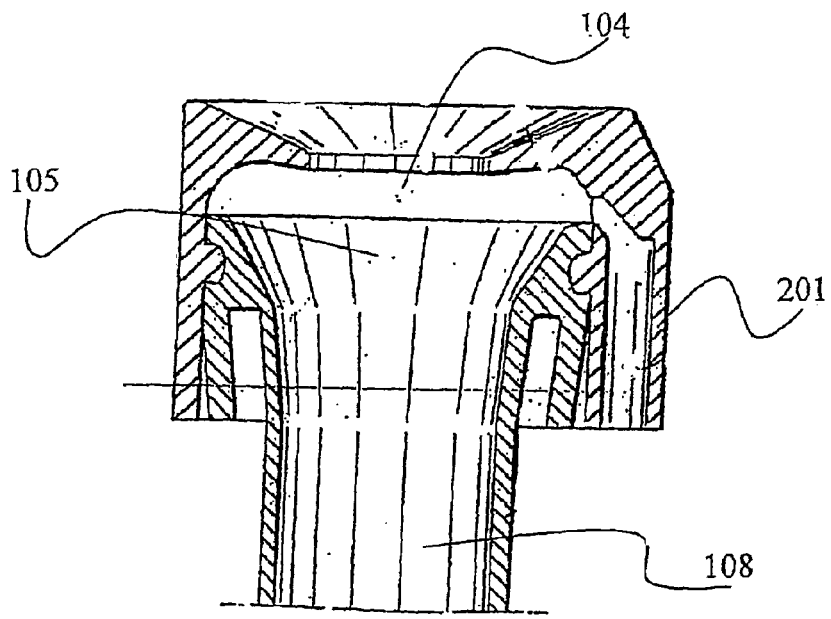
FIG. 2 is a schematic enlarged cross-sectional view of a space of a teat cup liner having connection means for applying vacuum to said space.

FIG. 2 is an enlarged schematic cross-sectional view of a teat cup liner having a different connection for supplying vacuum to the space 105. Similar details are denoted with the same numerals as in FIG. 1. The teat cup liner in FIG. 2 has a different space vacuum supply connection 201 compared to the teat cup liner in FIG. 1.

Figure 3:
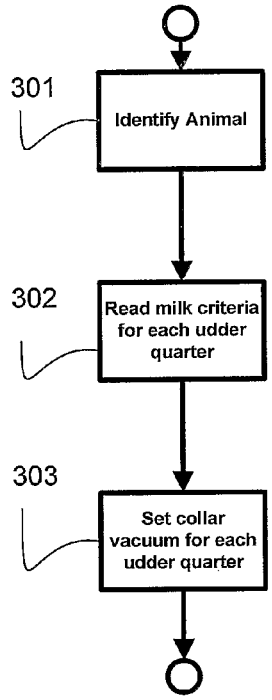
FIG. 3 is a schematic flow diagram of a method for controlling the vacuum in the space of a teat cup liner according to one variant of the invention.

FIG. 3 is a schematic flow diagram according to one variant of the invention. The method is preferably executed by a computer controlling the milking process including application of vacuum to the milk line 108 of the teat cup as well as pulsating vacuum and space vacuum. First, the animal is identified in a step 301. This identification is performed in a per ce known way, using for instance known animal identification equipment. It is of course also possible that the herdsman manually enters the identification for the animal on a terminal located close by.

Based on the identity of the animal, milk criteria parameters are read for each teat in step 302. The milk criteria parameters could for instance relate to average or expected milk yield for the animal per udder quarter, average or expected milk flow for each quarter, average or expected time to finish milking for each udder quarter as well as any illness, such as mastitis in any udder quarter. In short, any parameter which might affect the milking time for each udder quarter may be stored and used in the present method.

In step 303, the vacuum in each space is set according to the read milk criteria. The vacuum level in the space is set in relation to the vacuum level at the teat tip, so that a vacuum difference between the vacuum level below the teat tip and the vacuum level at the space is related to the read milking criteria. If a faster milking is desirable for a particular udder quarter a greater vacuum difference is set, and if a slower or gentler treatment is desired a lower vacuum difference is set.

It should be noted that the vacuum level below the teat tip may vary during the milking process. The vacuum level at the space can be adjusted in dependence of the vacuum level below the teat tip. For instance, the vacuum level below the teat tip may, with purpose, be set to a lower level at the beginning and/or end of the milking compared to the level which prevails at the middle of the milking. The vacuum level in the space can then be adjusted in dependence of the vacuum levels below the teat tip to achieve the desired goals.

Figure 5:
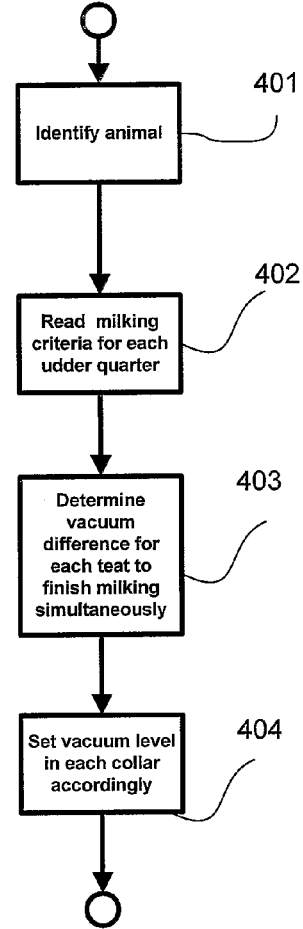
FIG. 5 is yet a schematic flow diagram according to another variant of the invention.

FIG. 5 is a schematic flow diagram according to another variant of the present invention. In step 401 the animal to be milked is identified according to known techniques as discussed above. In step 402 milking criteria parameters for each udder quarter are read and in step 403 the vacuum difference for each udder quarter is determined. The vacuum difference for each udder quarter is determined so that the milking will finish substantially at the same time for each udder quarter. Thereby, no udder quarter will be over milked. The vacuum difference is determined so that the vacuum difference is set to a higher level for udder quarters expected to take a longer time to finish milking, to thereby shorten their time to finish milking, and to a lower level for udder quarters expected to take a shorter time to finish milking, to thereby prolong their milking time.

Figure 4:
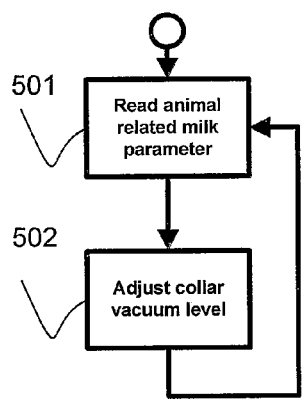
FIG. 4 is a schematic flow diagram of another method according to one variant of the invention.

FIG. 4 is a schematic flow diagram of a further improvement of a variant according to the present invention. The improvement according to the method in FIG. 4 is intended to be performed during milking. In step 501 an animal related milking parameter is read during milking. This parameter could for instance be the momentary milk flow, current milk yield or a calculated parameter such as expected time to finish milking based on the current milk yield or currently drawn milk amount. In step 502 the vacuum level in the teat cup liner space is adjusted to take into consideration the animal related milking parameter. If for example the milk flow is lower than expected at a particular time during the milking the vacuum in the space may be adjusted. Thus, a quick and efficient milking is achieved. This method is particular beneficial for quarter milking.

Figure 6:
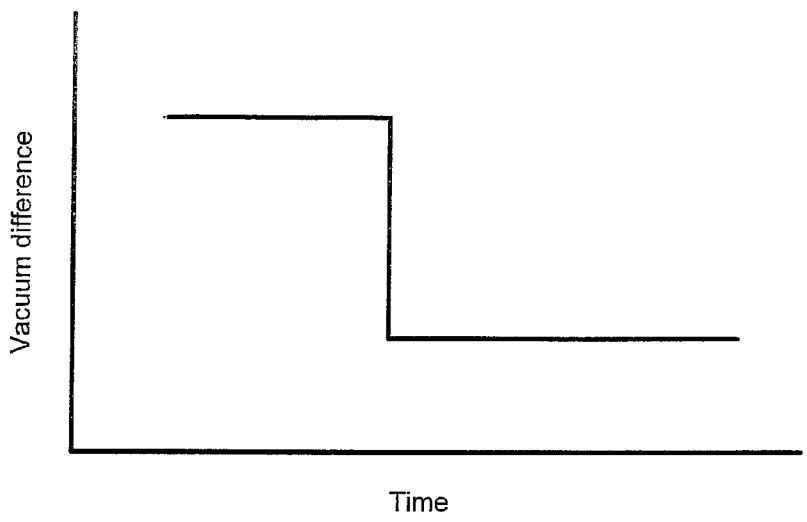
FIG. 6 is a schematic diagram of the vacuum difference between the vacuum level below the teat tip and the space in a teat cup liner during a milking according to one variant of the invention.

FIG. 6 is a schematic diagram disclosing the vacuum difference between the vacuum level below the teat tip and the vacuum level set in the teat cup liner space during a milking according to one variant of the invention. In this variant the vacuum difference is set to a first value at start of milking and to a second value at some time during milking. This can for instance be achieved with a timer.

Figure 7:
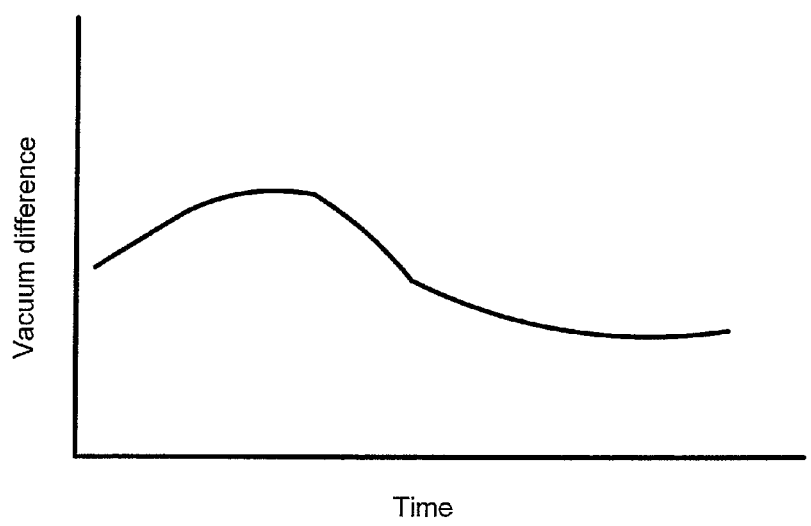
FIG. 7 is a schematic diagram of the vacuum difference between the vacuum level below the teat tip and the space in a teat cup liner during a milking according to another variant of the invention.

FIG. 7 is a schematic diagram disclosing the vacuum difference between the vacuum level below the teat tip and the vacuum level set in the teat cup liner space during a milking according to another variant of the invention. As can be seen in FIG. 7 the vacuum difference is set to a first value at start of milking but is continuously adjusted. During a first period the vacuum difference is increased, resulting in a faster milking, during a second period the vacuum difference is decreased and finally the vacuum difference is once again somewhat increased.

Figure 8:
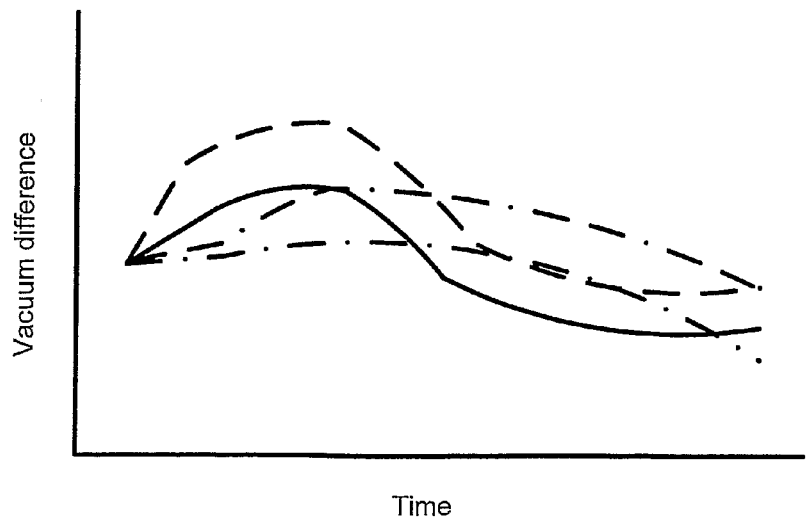
FIG. 8 is a schematic diagram of the vacuum difference between the vacuum level below the teat tip and the space for the four teats of a milking animal.

FIG. 8 finally is a schematic diagram disclosing the vacuum difference between the vacuum level below the teat tip and the vacuum level set in the teat cup liner space for all four udder quarters during a milking. In this variant the vacuum differences for each teat are controlled so that milking for all udder quarters are finished substantially at the same time.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:
1. A milking machine, comprising:
  at least a first teat cup having a teat cup shell and a teat cup liner, said teat cup liner includes a lower end connected to a milking vacuum source for drawing milk from a milking animal, and a top end forming a space and an teat entrance in which a teat of the milking animal is to be introduced, said teat cup liner further includes an inlet to said space connected to a vacuum source,
  wherein a control device controls vacuum in said space in accordance to a milking criteria of said milking animal, and said milking machine includes a vacuum difference measuring device, provided to measure a vacuum difference between the lower end of said teat cup liner and said space, and the milking machine adjusts the vacuum in said space during milking according to at least said measured vacuum difference.

2. The milking machine according to claim 1, further comprising
an animal identification device provided to detect an identity of the milking animal and relate said identity to at least one milking criteria.

3. The milking machine according to claim 1, wherein said vacuum in said space is dynamically varied during a milking process depending upon a momentary milk flow.

4. The milking machine according to claim 1, wherein said milking criteria is an expected time to finish milking of a particular udder quarter being milked.

5. The milking machine according to claim 1, wherein said milking criteria is an expected milk yield.

6. The milking machine according to claim 1, wherein
said milking machine includes one teat cup for each udder quarter to be milked, and
said control device is provided to set the vacuum in said space in each teat cup so that all udder quarters finish milking simultaneously.

7. The milking machine according to claim 1, wherein said vacuum in said space is set at start of milking.

8. The milking machine according to claim 1, wherein said vacuum in said space is set dynamically during milking.

9. The milking machine according to claim 1, wherein said vacuum in said space is set to a first value during a first part of said milking and to a second value during a second part of said milking.

10. The milking machine according to claim 1, wherein said vacuum in said space is set so that an increased vacuum difference is achieved between said space and said teat cup liner lower end when the milking animal has a higher milk flow than a milk flow of an average milking animal.

11. The milking machine according to claim 1, wherein said teat cup shell or teat cup liner includes a sensor for sensing vacuum levels in said space.

12. A milking machine, comprising:
at least a first teat cup having a teat cup shell and a teat cup liner, said teat cup liner includes a lower end connected to a milking vacuum source for drawing milk from a milking animal, and a top end forming a space and an teat entrance in which a teat of the milking animal is to be introduced, said teat cup liner further includes an inlet to said space connected to a vacuum source,
wherein a control device controls vacuum in said space and lower end of said teat cup liner in accordance to a milking criteria of said milking animal, and
said vacuum in said space is dynamically varied during a milking process depending upon a momentary milk flow.

13. A milking machine, comprising:
at least a first teat cup having a teat cup shell and a teat cup liner, said teat cup liner includes a lower end connected to a milking vacuum source for drawing milk from a milking animal, and a top end forming a space and an teat entrance in which a teat of the milking animal is to be introduced, said teat cup liner further includes an inlet to said space connected to a vacuum source,
wherein a control device controls vacuum in said space and lower end of said teat cup liner in accordance to a milking criteria of said milking animal, and
said milking criteria is an expected time to finish milking of a particular udder quarter being milked.

14. A milking machine, comprising:
at least one teat cup for each udder quarter to be milked having a teat cup shell and a teat cup liner, said teat cup liner includes a lower end connected to a milking vacuum source for drawing milk from a milking animal, and a top end forming a space and an teat entrance in which a teat of the milking animal is to be introduced, said teat cup liner further includes an inlet to said space connected to a vacuum source,
wherein a control device controls vacuum in said space and lower end of said teat cup liner in accordance to a milking criteria of said milking animal, and
said control device is provided to set the vacuum in said space in each teat cup so that all udder quarters finish milking simultaneously.

* * * * *